United States Patent
Wang

(10) Patent No.: US 10,629,013 B2
(45) Date of Patent: Apr. 21, 2020

(54) UNLOCKING CONTROL METHODS AND RELATED PRODUCTS

(71) Applicant: GUANGDONG OPPO MOBILE TELECOMMUNICATIONS CORP., LTD., Dongguan, Guangdong (CN)

(72) Inventor: Jian Wang, Guangdong (CN)

(73) Assignee: GUANGDONG OPPO MOBILE TELECOMMUNICATIONS CORP. LTD., Dongguan, Guangdong (CN)

(*) Notice: Subject to any disclaimer, the term of this patent is extended or adjusted under 35 U.S.C. 154(b) by 0 days.

(21) Appl. No.: 16/054,209

(22) Filed: Aug. 3, 2018

(65) Prior Publication Data

US 2019/0080541 A1    Mar. 14, 2019

(30) Foreign Application Priority Data

Sep. 12, 2017 (CN) .......................... 2017 1 0819492

(51) Int. Cl.
| | |
|---|---|
| G07C 9/00 | (2020.01) |
| G06F 21/32 | (2013.01) |
| G06F 1/3231 | (2019.01) |
| G06F 1/3287 | (2019.01) |
| G06F 3/041 | (2006.01) |
| G06K 9/00 | (2006.01) |

(52) U.S. Cl.
CPC ....... *G07C 9/00563* (2013.01); *G06F 1/3231* (2013.01); *G06F 1/3287* (2013.01); *G06F 3/0412* (2013.01); *G06F 3/0416* (2013.01); *G06F 21/32* (2013.01); *G06K 9/00221* (2013.01); *G06F 2203/04104* (2013.01)

(58) Field of Classification Search
CPC .................. G07C 9/00563; G06F 2203/04104
USPC ......................................................... 340/5.53
See application file for complete search history.

(56) References Cited

U.S. PATENT DOCUMENTS 8,825,021 B2 * 9/2014 Wang ................. G07C 9/00309
455/414.1
2013/0322705 A1    12/2013 Wong
(Continued)

FOREIGN PATENT DOCUMENTS

| CN | 103383595 | 11/2013 |
|---|---|---|
| CN | 105740690 | 7/2016 |

(Continued)

OTHER PUBLICATIONS

EPO, Office Action for EP Application No. 18187556, dated Jan. 4, 2019.

(Continued)

*Primary Examiner* — Qutbuddin Ghulamali
(74) *Attorney, Agent, or Firm* — Hodgson Russ LLP

(57) ABSTRACT

Embodiments of the present disclosure provide unlocking control methods and related produces. The method includes the following. When detecting an unlocking instruction for a mobile terminal in a screen-off and screen-locked state, a first operation and a second operation are performed in parallel. The first operation is a face recognition operation. The second operation is configured to ensure that a power management service (PMS) is in an awake state. When detecting that a result of the face recognition operation is success, a screen locked interface is removed, and the PMS is notified to light a touch display screen.

20 Claims, 5 Drawing Sheets

(56) References Cited

U.S. PATENT DOCUMENTS

2015/0199554 A1* 7/2015 Merrell ............. G06K 9/00033
                                                    382/124
2017/0193214 A1   7/2017 Shim et al.
2018/0302786 A1* 10/2018 Yu ..................... G06F 3/0484

FOREIGN PATENT DOCUMENTS

| CN | 105808108 | 7/2016 |
| CN | 106055953 | 10/2016 |
| CN | 106066955 | 11/2016 |
| CN | 106096356 | 11/2016 |
| CN | 106886703 | 6/2017 |
| CN | 107566650 | 1/2018 |
| EP | 3185160 | 6/2017 |
| WO | 2017059570 | 4/2017 |

OTHER PUBLICATIONS

WIPO, English Translation of ISR/WO for PCT/CN2018/099673, Sep. 30, 2018.
SIPO, First Office Action for CN Application No. 201710819492, dated Apr. 25, 2019.

\* cited by examiner

UNLOCKING CONTROL METHODS AND RELATED PRODUCTS

CROSS REFERENCE TO RELATED APPLICATION

This application is based upon and claims priority to Chinese Patent Application No. 201710819492.0, filed on Sep. 12, 2017, the entire content of which is incorporated herein by reference.

TECHNICAL FIELD

The present disclosure generally relates to a field of mobile terminal technologies, and more particularly, to an unlocking control method and related products.

BACKGROUND

With the popularization of smartphones, the smartphones may support more and more applications and have more and more functions. The smartphones are developing to be diversified and personalized, becoming an indispensable electronic product in the user's life.

At present, with the increasing security requirements for the smartphones, various biological information unlocking solutions have emerged, such as fingerprint unlocking, face unlocking, iris unlocking, etc. The face unlocking becomes the first choice for many smartphones since it has a faster unlocking speed and a higher recognition success rate.

SUMMARY

In a first aspect, an embodiment of the present disclosure provides a mobile terminal, including a processor, a face image collecting device and a memory. The face image collecting device is configured to collect a face image. The memory is configured to store a preset face template. The processor is configured to carry out following actions. A first operation and a second operation are performed in parallel when detecting an unlocking instruction for the mobile terminal in a screen-off and screen-locked state. The first operation is a face recognition operation. The second operation is configured to ensure that a power management service (PMS) is in an awake state. When detecting that a result of the face recognition operation is success, a screen locked interface is removed and the PMS is notified to light a touch display screen.

In a second aspect, an embodiment of the present disclosure provides an unlocking control method. The method includes the following. When detecting an unlocking instruction for a mobile terminal in a screen-off and screen-locked state, a first operation and a second operation in parallel are performed. The first operation is a face recognition operation. The second operation is configured to ensure that a power management service (PMS) is in an awake state. When detecting that a result of the face recognition operation is success, a screen locked interface is removed. The PMS is notified to light a touch display screen.

In a third aspect, an embodiment of the present disclosure provides a computer readable storage medium having stored computer programs for electronic data exchange. The computer programs cause a computer to perform a part of or all acts of any method of the second aspect of the embodiments of the present disclosure as described above. The computer includes a mobile terminal.

BRIEF DESCRIPTION OF THE DRAWINGS

To clearly illustrate embodiments of the present disclosure or technical solutions in the prior art, a brief description of drawings used in embodiments or in the prior art descriptions is given below. Obviously, the drawings in the following descriptions are only part embodiments of the present disclosure, and for those skilled in the art, other drawings can be obtained according to these drawings without creative labor.

DETAILED DESCRIPTION

Figure 1:
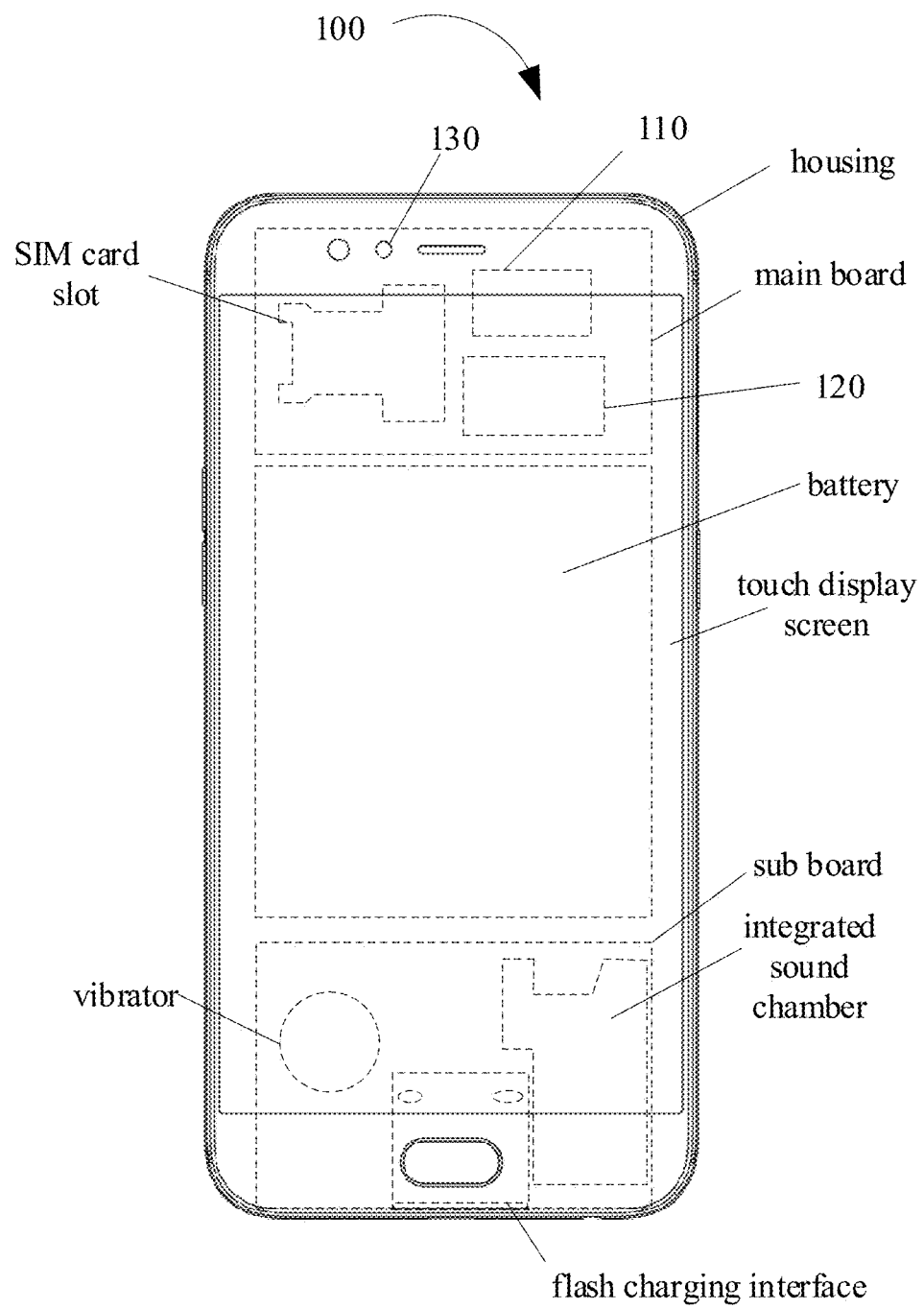
FIG. 1 is a schematic diagram illustrating a mobile terminal according to an embodiment of the present disclosure.

To make those skilled in the art a better understanding of solutions of the present disclosure, the technical solutions in the embodiments of the present disclosure will be clearly and completely described in the following with reference to the drawings in the embodiments of the present disclosure. Obviously, the described embodiments are only a part of the embodiments of the present disclosure, and not all the embodiments. All other embodiments obtained by those skilled in the art based on the embodiments of the present disclosure without creative efforts are within the scope of the present disclosure.

In the specification, claims and the above drawings of the present disclosure, terms of "first" and "second" are only used for distinguishing different objects, not describing a specific order. It should be further understood that, when used in the specification, terms "comprising", "containing" and any transformations cover a non-exclusive inclusion. For example, a process, method, system, product, or device that comprises a series of acts or units is not limited to the listed acts or units, but optionally also includes acts or units not listed, or, optionally other acts or units inherent to these process, method, product, or device.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

The mobile terminal related in the embodiments of the present disclosure may include handheld devices having wireless communication functions, in-vehicle devices, wearable devices, computing devices, other processing devices coupled to wireless modems, user equipment (UE), mobile stations (MS), terminal devices, and the like. For convenience of description, the devices mentioned above are collectively referred to as mobile terminals.

The mobile terminal described in the embodiment of the present disclosure is provided with a face image collecting device. The face image collecting device may be a general camera module, such as a front camera. The embodiments of the present disclosure will be described in detail below.

The present disclosure relates to a mobile terminal, including a processor, a face image collecting device and a memory. The face image collecting device is configured to collect a face image. The memory is configured to store a preset face template. The processor is configured to carry out following actions. A first operation and a second operation are performed in parallel when detecting an unlocking instruction for the mobile terminal in a screen-off and screen-locked state. The first operation is a face recognition operation. The second operation is configured to ensure that a power management service (PMS) is in an awake state. When detecting that a result of the face recognition operation is success, a screen locked interface is removed and the PMS is notified to light a touch display screen.

The present disclosure relates to an unlocking control method. The method includes the following actions. When detecting an unlocking instruction for a mobile terminal in a screen-off and screen-locked state, a first operation and a second operation in parallel are performed. The first operation is a face recognition operation. The second operation is configured to ensure that a power management service (PMS) is in an awake state. When detecting that a result of the face recognition operation is success, a screen locked interface is removed. The PMS is notified to light a touch display screen.

The present disclosure relates to a mobile terminal including a paralleling unit, a removing unit and a notifying unit. The paralleling unit is configured to, when detecting an unlocking instruction for the mobile terminal in a screen-off and screen-locked state, perform a first operation and a second operation in parallel. The first operation is a face recognition operation. The second operation is configured to ensure that a power management service (PMS) is in an awake state. The removing unit is configured to, when detecting that a result of the face recognition operation is success, remove a screen locked interface. The notifying unit is configured to notify the PMS to light a touch display screen.

The present disclosure relates to a mobile terminal including a processor, a memory, a communication interface and one or more programs. The one or more programs are stored in the memory and configured to be executed by the processor to implement instructions of acts in any method of the embodiments of the present disclosure as described above.

The present disclosure relates to a computer readable storage medium having stored computer programs for electronic data exchange. The computer programs cause a computer to perform a part of or all acts of any method of the embodiments of the present disclosure as described above. The computer includes a mobile terminal.

The present disclosure relates to a computer program product. The computer program product includes a non-transitory computer readable storage medium storing computer programs. The computer programs are operative to cause a computer to perform a part of or all acts of any method of the embodiments of the present disclosure as described above. The computer program product may be a software installation package. The computer includes a mobile terminal.

FIG. 1 is a schematic diagram illustrating a mobile terminal 100 according to an embodiment of the present disclosure. As illustrated in FIG. 1, the mobile terminal 100 includes a housing, a touch display screen, a main board, a battery and a sub board. The main board is provided with a processor 110, a memory 120, a front camera 130, a subscriber identification module (SIM) card slot, etc. The sub main is provided with a vibrator, an integrated sound chamber and a VOOC (Voltage Open Loop Multi-Step Constant-Current Charging) flash charging interface. The front camera 130 forms the face image collecting device of the mobile terminal 100. The face image collecting device may include a camera.

The face image collecting device 130 is configured to collect a face image.

The memory 120 is configured to a preset face template.

The processor 110 is configured to carry out following actions. A first operation and a second operation are performed in parallel when detecting an unlocking instruction for the mobile terminal in a screen-off and screen-locked state. The first operation is a face recognition operation based on the face image and the preset face template. The second operation being configured to ensure that a PMS is in an awake state. When detecting that a result of the face recognition operation is success, a screen locked interface is removed. The PMS is notified to light a touch display screen.

The PMS is a service for lighting peripherals such as backlights and breathing lights in the Android system. The service is launched after the mobile terminal is powered on and enters dormancy when the mobile terminal is in a normal state.

The processor 110 is a control center of the mobile terminal. The processor 110 may be coupled to various parts of the entire mobile terminal by various interfaces and wires, and performs various functions and processes data to perform overall monitoring on the mobile terminal by running or executing software programs and/or modules stored in the memory 120, and invoking data stored in the memory 120. Alternatively, the processor 110 may be integrated with an application processor and a modem processor. The application processor mainly processes an operating system, user interfaces, applications, and the like. The modem processor mainly processes the wireless communication. It may be understood that the above modem processor may be not integrated into the processor 110.

The memory 120 may be configured to store software programs and modules. The processor 110 may execute various functional applications and data processing in the mobile terminal by running software programs and modules stored in the memory 120. The memory 120 may mainly include a storage program area and a storage data area. The storage program region may store an operation system, at least one function-required applications and the like. The storage data area may store data produced by using the mobile terminal, and the like. Moreover, the memory 120 may include a high speed random access memory and may further include a non-volatility memory, such as at least one disk memory, a flash memory, or other volatility solid state memory.

In the embodiments of the present disclosure, when detecting the unlocking instruction for the mobile terminal in the screen-off and screen-locked state, the mobile terminal performs the first operation and the second operation in parallel, in which the first operation is the face recognition operation and the second operation is configured to ensure that the PMS is in the awake state. When detecting that the result of the face recognition operation is success, the screen locked interface is removed. The PMS is notified to light the touch display screen to display a system desktop directly. Since the mobile terminal performs the face recognition operation and the operation of ensuring that the PMS is in the awake state in parallel, a duration of a process of waking up the PMS is made as early as possible. Compared with the conventional solution of waking up the PMS after the recognition, the duration may be significantly shortened in the embodiments of the present disclosure, thereby reducing an unlocking duration of the mobile terminal in the screen-off and screen-locked state and improving the user experience.

In one or more embodiments, the processor 120 is further configured to following actions. When detecting that the result of the face recognition operation is failure, the PMS is notified to light the touch display screen and a message of prompting recognition failure is outputted. Or when detecting that the result of the face recognition operation is failure, the PMS is controlled to enter dormancy and the mobile terminal is controlled to vibrate to prompt recognition failure.

In the one or more embodiments, in the case that the face recognition operation is unsuccessful, the mobile terminal may remind the user of the recognition failure through a flexible reminding mechanism, thereby improving convenience and intelligence.

In one or more embodiments, ensuring that the PMS is in the awake state includes: when detecting that the PMS is not woken up, waking up the PMS.

In the one or more embodiments, the time point of waking up the PMS has been advanced to a time point that the unlocking instruction is detected, such that the entire wake-up duration is advanced, shortening the processing duration of the whole process from the screen-off and screen-locked state to the screen-on and screen-unlocked state, speeding up, and improving the user experience.

In one or more embodiments, ensuring that the PMS is in the awake state includes: when detecting that the PMS is woken up, maintaining the awake state of the PMS.

In one or more embodiments, the processor 120 is further configured to following actions. The PMS is waked up when detecting that a system state of the mobile terminal meets a first preset condition.

The system state may be information of various preset parameters such as time information, location information and power information, or may be a preset state such as a charging state, a high battery state, which is not limited herein. Correspondingly, the first preset condition may also be flexibly set according to the type of the system state in advance, so as to further advance the time point of waking up the PMS, thereby further shortening the processing duration of the whole process that the mobile terminal switches from the screen-off and screen-locked state to the screen-on and screen-unlocked state, speeding up, and improving the user experience.

For example, it is assumed that the first preset condition is to wake up the PMS when detecting that the mobile terminal is in a charging state. Then, the mobile terminal detects that the current system state is the charging state and wakes up the PMS.

In the one or more embodiments, the mobile terminal further wakes up the PMS in advance by state detection, thereby shortening the processing duration of the whole process that the mobile terminal switches from the screen-off and screen-locked state to the screen-on and screen-unlocked state, speeding up, and improving the user experience.

In one or more embodiments, the processor 120 is further configured to following actions. The unlocking instruction is generated when detecting that a touch operation in a preset area of the touch display screen of the mobile terminal in the screen-off and screen-locked state meets a second preset condition.

The preset area may be an upper area, a lower area, a left area, and the like, and is not limited herein. The second condition may be a double-click trigger, a three-click trigger, a two-finger touch trigger, etc., and is not limited herein.

In the present one or more embodiments, the mobile terminal may flexibly set the unlocking trigger condition in the screen-off and screen-locked state, which is beneficial to improving the convenience and intelligence of screen unlocking when the mobile terminal is in the screen-off and screen-locked state.

In one or more embodiments, the face recognition operation includes a camera switching-on operation, a face image collecting operation, a feature point extracting operation, a template comparing operation, and an operation of generating the recognition result.

The face image collecting operation includes a face positioning operation and an image capturing operation.

The face positioning operation includes a face position recognizing operation and a position reminding operation.

The position reminding operation includes a head up reminding operation, a head down reminding operation, a head left turning reminding operation, and a head right turning reminding operation. Any two of the head up reminding operation, the head down reminding operation, the head left turning reminding operation, and the head right turning reminding operation are different with each other.

In an implementation, the above reminding operations may be reminded by different vibration mechanisms or by a speaker to play a voice, etc., which is not limited herein.

In the present one or more embodiments, the mobile terminal may promptly and flexibly remind the user of adjusting the position of the head to accurately locate the face in the process of performing the face recognition operation, thereby accurately collecting the face image, which is beneficial to improving the accuracy of collecting the face image and ultimately improving the real-time, accuracy and success rate of the face recognition operation.

Figure 2A:
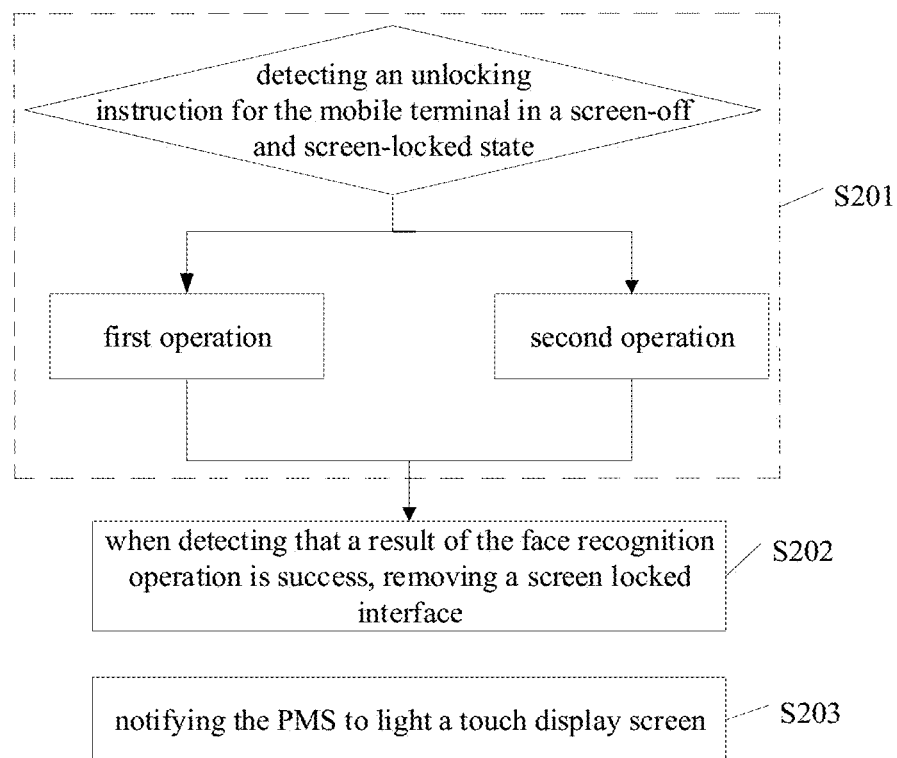
FIG. 2A is a flow chart illustrating an unlocking control method according to an embodiment of the present disclosure.

FIG. 2A is a flow chart illustrating an unlocking control method according to an embodiment of the present disclosure. The method may be applicable to the mobile terminal. As illustrated in FIG. 2A, the unlocking control method includes the following.

At block S201, when detecting an unlocking instruction for the mobile terminal in a screen-off and screen-locked state, the mobile terminal performs a first operation and a second operation in parallel. The first operation is a face recognition operation. The second operation is configured to ensure that a power management service (PMS) is in an awake state.

The performing of the first operation and the second operation in parallel may be a dual-process parallel operation of the operating system, or a dual-thread parallel operation of one process, or parallel operations of two central processing units (CPUs) of the dual-core system, which is not limited herein.

At block S202, when detecting that a result of the face recognition operation is success, the mobile terminal removes a screen locked interface.

At block S203, the mobile terminal notifies the PMS to light a touch display screen.

In an implementation, after the mobile terminal notifies the PMS to light the touch display screen, the mobile terminal may directly display a system desktop or display a preset application interface. The preset application interface may be an application interface of a third-party application or a system application, which is not limited here.

In the embodiments of the present disclosure, when detecting the unlocking instruction for the mobile terminal in the screen-off and screen-locked state, the mobile terminal performs the first operation and the second operation in parallel, in which the first operation is the face recognition operation and the second operation is configured to ensure that the PMS is in the awake state. When detecting that the result of the face recognition operation is success, the screen locked interface is removed. The PMS is notified to light the touch display screen to display a system desktop directly. Since the mobile terminal performs the face recognition operation and the operation of ensuring that the PMS is in the awake state in parallel, a duration of a process of waking up the PMS is made as early as possible. Compared with the conventional solution of waking up the PMS after the recognition, the duration may be significantly shortened in the embodiments of the present disclosure, thereby reducing an unlocking duration of the mobile terminal in the screen-off and screen-locked state and improving the user experience.

In one or more embodiments, the method further includes the following. When detecting that the result of the face recognition operation is failure, the mobile terminal notifies the PMS to light the touch display screen and outputs a message of prompting recognition failure. When detecting that the result of the face recognition operation is failure, the mobile terminal controls the PMS to enter dormancy and vibrates to prompt recognition failure.

In the present one or more embodiments, in the case that the face recognition operation is unsuccessful, the mobile terminal may remind the user of the recognition failure through a flexible reminding mechanism, thereby improving convenience and intelligence.

In one or more embodiments, ensuring by the mobile terminal that the PMS is in the awake state includes: when detecting that the PMS is not woken up, waking up the PMS.

In the one or more embodiments, the time point of waking up the PMS has been advanced to a time point that the unlocking instruction is detected, such that the entire wake-up duration is advanced, shortening the processing duration of the whole process from the screen-off and screen-locked state to the screen-on and screen-unlocked state, speeding up, and improving the user experience.

In one or more embodiments, ensuring by the mobile terminal that the PMS is in the awake state includes: when detecting that the PMS is woken up, maintaining the awake state of the PMS.

In one or more embodiments, the method further includes the following. The mobile terminal wakes up the PMS when detecting that a system state of the mobile terminal meets a first preset condition.

The system state may be information of various preset parameters such as time information, location information and power information, or may be a preset state such as a charging state, a high battery state, which is not limited herein. Correspondingly, the first preset condition may also be flexibly preset according to the type of the system state to further advance the time point of waking up the PMS, thereby further shortening the processing duration of the whole process that the mobile terminal switches from the screen-off and screen-locked state to the screen-on and screen-unlocked state, speeding up, and improving the user experience.

For example, it is assumed that the first preset condition is to wake up the PMS when detecting that the mobile terminal is in the charging state. Then, the mobile terminal detects that the current system state is the charging state and wakes up the PMS.

In the present one or more embodiments, the mobile terminal further wakes up the PMS in advance by state detection, thereby shortening the processing duration of the whole process that the mobile terminal switches from the screen-off and screen-locked state to the screen-on and screen-unlocked state, speeding up, and improving the user experience.

In one or more embodiments, the method further includes the following. The mobile terminal generates the unlocking instruction when detecting that a touch operation in a preset area of the touch display screen of the mobile terminal in the screen-off and screen-locked state meets a second preset condition.

Figure 2B:
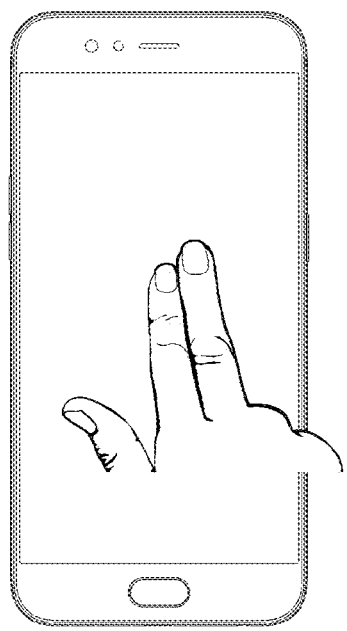
FIG. 2B is a schematic diagram illustrating triggering an unlocking process by a two-finger touch according to an embodiment of the present disclosure.

The preset area may be an upper area, a lower area, a left area, and the like, and is not limited herein. As illustrated in FIG. 2B, the touch operation may be a double-click operation, a two-finger touch, or the like. Correspondingly, the second condition may be a double-click trigger, a two-finger touch trigger, or the like, and is not limited herein.

In the present one or more embodiments, the mobile terminal may flexibly set the unlocking trigger condition in the screen-off and screen-locked state, which is beneficial to improving the convenience and intelligence of screen unlocking when the mobile terminal is in the screen-off and screen-locked state.

In one or more embodiments, the face recognition operation includes a camera switching-on operation, a face image collecting operation, a feature point extracting operation, a template comparing operation, and an operation of generating the recognition result.

The face image collecting operation includes a face positioning operation and an image capturing operation.

The face positioning operation includes a face position recognizing operation and a position reminding operation.

The position reminding operation includes a head up reminding operation, a head down reminding operation, a head left turning reminding operation, and a head right turning reminding operation. Any two of the head up reminding operation, the head down reminding operation, the head left turning reminding operation, and the head right turning reminding operation are different with each other.

In an implementation, the above reminding operations may be reminded by different vibration mechanisms or by a speaker to play a voice, etc., which is not limited herein.

In the present one or more embodiments, the mobile terminal may promptly and flexibly remind the user of adjusting the position of the head to accurately locate the face in the process of performing the face recognition operation, thereby accurately collecting the face image, which is beneficial to improving the accuracy of collecting the face image and ultimately improving the real-time, accuracy and success rate of the face recognition operation.

Figure 3:
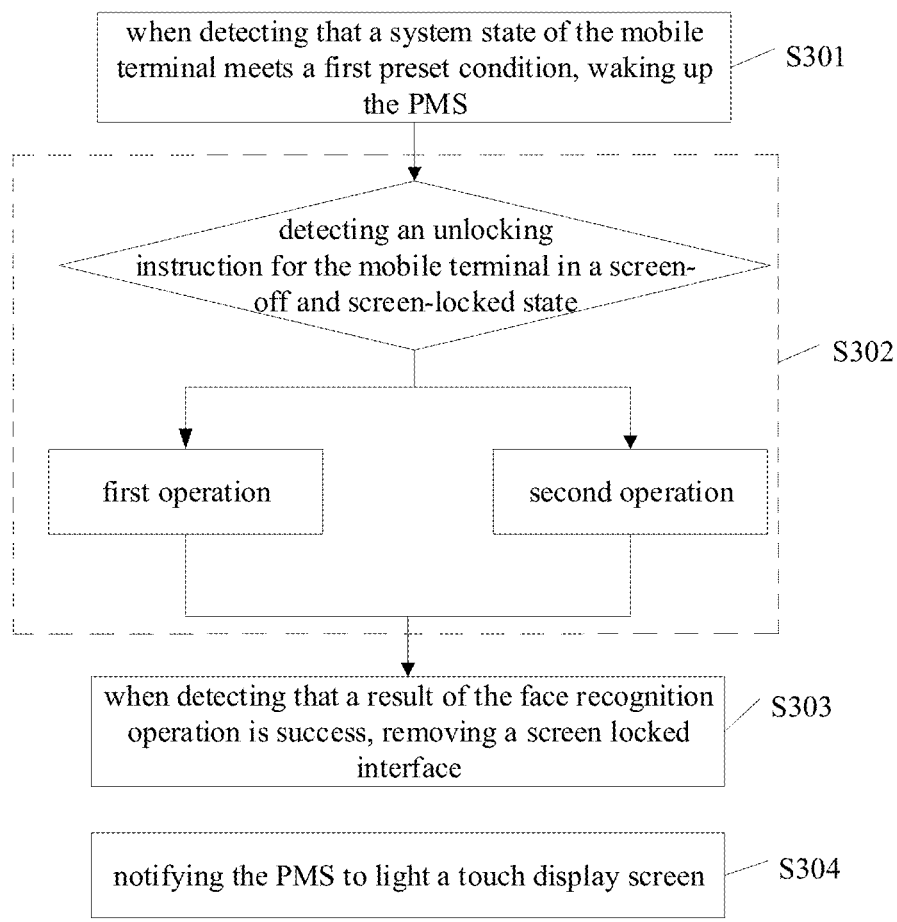
FIG. 3 is a flow chart illustrating an unlocking control method according to another embodiment of the present disclosure.

Consistent with the embodiment illustrated in FIG. 2A, FIG. 3 is a flow chart illustrating an unlocking control method according to an embodiment of the present disclosure. The method may be applicable to the mobile terminal. As illustrated in FIG. 3, the unlocking control method includes the following.

At block S301, the mobile terminal wakes up the PMS when detecting that a system state of the mobile terminal meets a first preset condition.

At block S302, when detecting an unlocking instruction for the mobile terminal in a screen-off and screen-locked state, the mobile terminal performs a first operation and a second operation in parallel. The first operation is a face recognition operation. The second operation is configured to ensure that the PMS is in an awake state.

At block S303, when detecting that a result of the face recognition operation is success, the mobile terminal removes a screen locked interface.

At block S304, the mobile terminal notifies the PMS to light a touch display screen.

In the embodiments of the present disclosure, when detecting the unlocking instruction for the mobile terminal in the screen-off and screen-locked state, the mobile terminal performs the first operation and the second operation in parallel, in which the first operation is the face recognition operation and the second operation is configured to ensure that the PMS is in the awake state. When detecting that the result of the face recognition operation is success, the screen locked interface is removed. The PMS is notified to light the touch display screen to display a system desktop directly. Since the mobile terminal performs the face recognition operation and the operation of ensuring that the PMS is in the awake state in parallel, a duration of a process of waking up the PMS is made as early as possible. Compared with the conventional solution of waking up the PMS after the recognition, the duration may be significantly shortened in the embodiments of the present disclosure, thereby reducing an unlocking duration of the mobile terminal in the screen-off and screen-locked state and improving the user experience.

In addition, the mobile terminal further wakes up the PMS in advance by state detection, thereby shortening the processing duration of the whole process that the mobile terminal switches from the screen-off and screen-locked state to the screen-on and screen-unlocked state, speeding up, and improving the user experience.

Figure 4:
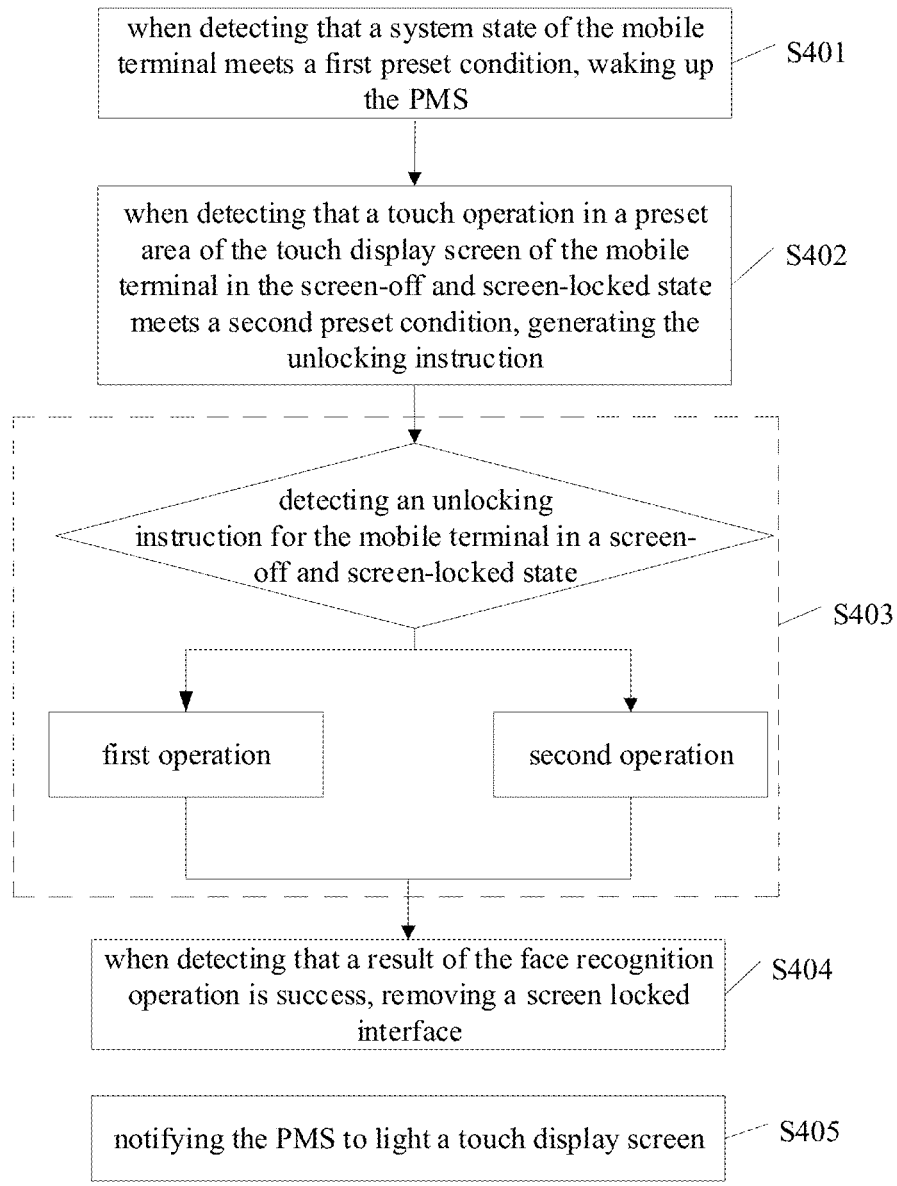
FIG. 4 is a flow chart illustrating an unlocking control method according to another embodiment of the present disclosure.

Consistent with the embodiment illustrated in FIG. 2A, FIG. 4 is a flow chart illustrating an unlocking control method according to an embodiment of the present disclosure. The method may be applicable to the mobile terminal. As illustrated in FIG. 4, the unlocking control method includes the following.

At block S401, the mobile terminal wakes up the PMS when detecting that a system state of the mobile terminal meets a first preset condition.

At block S402, the mobile terminal generates the unlocking instruction when detecting that a touch operation in a preset area of the touch display screen of the mobile terminal in the screen-off and screen-locked state meets a second preset condition.

At block S403, when detecting an unlocking instruction for the mobile terminal in a screen-off and screen-locked state, the mobile terminal performs a first operation and a second operation in parallel. The first operation is a face recognition operation. The second operation is configured to ensure that the PMS is in an awake state.

At block S404, when detecting that a result of the face recognition operation is success, the mobile terminal removes a screen locked interface.

At block S405, the mobile terminal notifies the PMS to light a touch display screen.

In the embodiments of the present disclosure, when detecting the unlocking instruction for the mobile terminal in the screen-off and screen-locked state, the mobile terminal performs the first operation and the second operation in parallel, in which the first operation is the face recognition operation and the second operation is configured to ensure that the PMS is in the awake state. When detecting that the result of the face recognition operation is success, the screen locked interface is removed. The PMS is notified to light the touch display screen to display a system desktop directly. Since the mobile terminal performs the face recognition operation and the operation of ensuring that the PMS is in the awake state in parallel, a duration of a process of waking up the PMS is made as early as possible. Compared with the conventional solution of waking up the PMS after the recognition, the duration may be significantly shortened in the embodiments of the present disclosure, thereby reducing an unlocking duration of the mobile terminal in the screen-off and screen-locked state and improving the user experience.

In addition, the mobile terminal further wakes up the PMS in advance by state detection, thereby shortening the processing duration of the whole process that the mobile terminal switches from the screen-off and screen-locked state to the screen-on and screen-unlocked state, speeding up, and improving the user experience.

In addition, the mobile terminal may flexibly set the unlocking trigger condition in the screen-off and screen-locked state, which is beneficial to improving the convenience and intelligence of screen unlocking when the mobile terminal is in the screen-off and screen-locked state.

Figure 5:
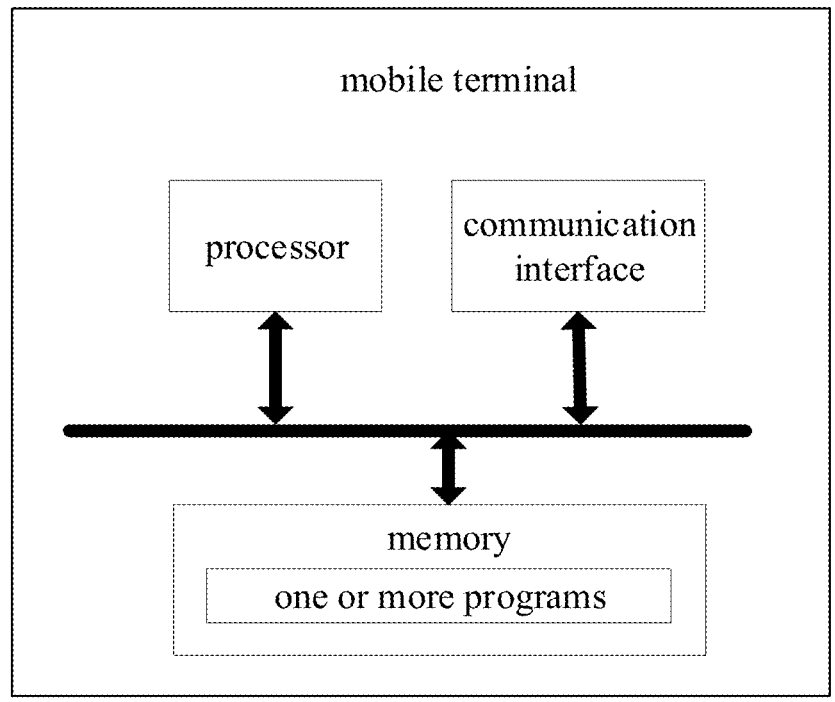
FIG. 5 is a schematic diagram illustrating a mobile terminal according to an embodiment of the present disclosure.

Consistent with the embodiments illustrated in FIGS. 2A, 3 and 4, FIG. 5 is a schematic diagram illustrating a mobile terminal according to an embodiment of the present disclosure. As illustrated in FIG. 5, the mobile terminal includes a processor, a memory, a communication interface, and one or more programs. The one or more programs are stored in the memory and configured to be executed by the processor to implement instructions of the following acts.

When detecting an unlocking instruction for the mobile terminal in a screen-off and screen-locked state, a first operation and a second operation are performed in parallel. The first operation is a face recognition operation. The second operation is configured to ensure that a power management service (PMS) is in an awake state.

When detecting that a result of the face recognition operation is success, a screen locked interface is removed.

The PMS is notified to light a touch display screen.

In the embodiments of the present disclosure, when detecting the unlocking instruction for the mobile terminal in the screen-off and screen-locked state, the mobile terminal performs the first operation and the second operation in parallel, in which the first operation is the face recognition operation and the second operation is configured to ensure that the PMS is in the awake state. When detecting that the result of the face recognition operation is success, the screen locked interface is removed. The PMS is notified to light the touch display screen to display a system desktop directly. Since the mobile terminal performs the face recognition operation and the operation of ensuring that the PMS is in the awake state in parallel, a duration of a process of waking up the PMS is made as early as possible. Compared with the conventional solution of waking up the PMS after the recognition, the duration may be significantly shortened in the embodiments of the present disclosure, thereby reducing an unlocking duration of the mobile terminal in the screen-off and screen-locked state and improving the user experience.

In one or more embodiments, the instructions in the programs may be configured to perform acts of: when detecting that the result of the face recognition operation is failure, notifying the PMS to light the touch display screen and outputting a message of prompting recognition failure; or when detecting that the result of the face recognition operation is failure, controlling the PMS to enter dormancy and controlling the mobile terminal to vibrate to prompt recognition failure.

In one or more embodiments, ensuring that the PMS is in the awake state includes: when detecting that the PMS is not woken up, waking up the PMS.

In one or more embodiments, ensuring that the PMS is in the awake state includes: when detecting that the PMS is woken up, maintaining the awake state of the PMS.

In one or more embodiments, the instructions in the programs may be configured to perform acts of: waking up the PMS when detecting that a system state of the mobile terminal meets a first preset condition.

In one or more embodiments, the instructions in the programs may be configured to perform acts of: generating the unlocking instruction when detecting that a touch operation in a preset area of the touch display screen of the mobile terminal in the screen-off and screen-locked state meets a second preset condition.

In one or more embodiments, the face recognition operation includes a camera switching-on operation, a face image collecting operation, a feature point extracting operation, a template comparing operation, and an operation of generating the recognition result.

The face image collecting operation includes a face positioning operation and an image capturing operation.

The face positioning operation includes a face position recognizing operation and a position reminding operation.

The position reminding operation includes a head up reminding operation, a head down reminding operation, a head left turning reminding operation, and a head right turning reminding operation. Any two of the head up reminding operation, the head down reminding operation, the head left turning reminding operation, and the head right turning reminding operation are different with each other.

In an implementation, the above reminding operations may be reminded by different vibration mechanisms or by a speaker to play a voice, etc., which is not limited herein.

In the one or more embodiments, the mobile terminal may promptly and flexibly remind the user of adjusting the position of the head to accurately locate the face in the process of performing the face recognition operation, thereby accurately collecting the face image, which is beneficial to improving the accuracy of collecting the face image and ultimately improving the real-time, accuracy and success rate of the face recognition operation.

Figure 6:
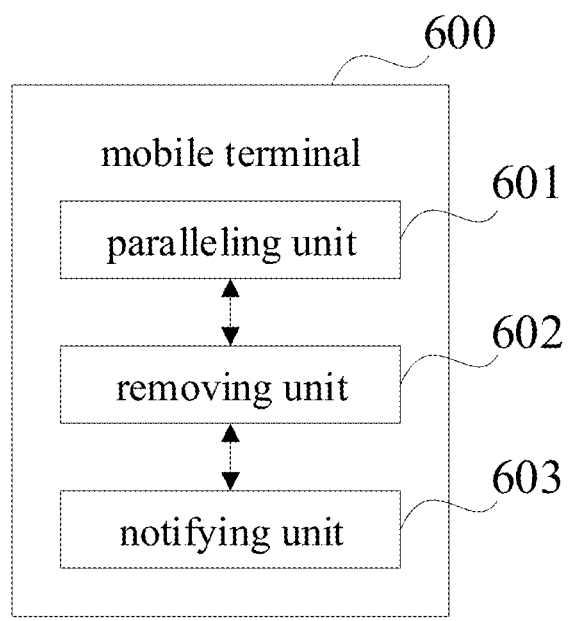
FIG. 6 is a block diagram illustrating a mobile terminal according to an embodiment of the present disclosure.

Consistent with the above embodiments, FIG. 6 illustrates a block diagram of a possible functional unit composition of the mobile terminal provided in embodiments of the present disclosure. The mobile terminal 600 includes a paralleling unit 601, a removing unit 602 and a notifying unit 603.

The paralleling unit 601 is configured to, when detecting an unlocking instruction for the mobile terminal in a screen-off and screen-locked state, perform a first operation and a second operation in parallel. The first operation is a face recognition operation. The second operation is configured to ensure that a PMS is in an awake state.

The removing unit 602 is configured to, when detecting that a result of the face recognition operation is success, remove a screen locked interface.

The notifying unit 603 is configured to notify the PMS to light a touch display screen.

In the embodiments of the present disclosure, when detecting the unlocking instruction for the mobile terminal in the screen-off and screen-locked state, the mobile terminal performs the first operation and the second operation in parallel, in which the first operation is the face recognition operation and the second operation is configured to ensure that the PMS is in the awake state. When detecting that the result of the face recognition operation is success, the screen locked interface is removed. The PMS is notified to light the touch display screen to display a system desktop directly. Since the mobile terminal performs the face recognition operation and the operation of ensuring that the PMS is in the awake state in parallel, a duration of a process of waking up the PMS is made as early as possible. Compared with the conventional solution of waking up the PMS after the recognition, the duration may be significantly shortened in the embodiments of the present disclosure, thereby reducing an unlocking duration of the mobile terminal in the screen-off and screen-locked state and improving the user experience.

In one or more embodiments, the notifying unit 603 is configured to: when detecting that the result of the face recognition operation is failure, notify the PMS to light the touch display screen and output a message of prompting recognition failure. The mobile terminal further includes a dormancy unit and a vibration unit. The dormancy unit is configured to, when detecting that the result of the face recognition operation is failure, control the PMS to enter dormancy. The vibration unit is configured to control the mobile terminal to vibrate to prompt recognition failure.

In one or more embodiments, ensuring that the PMS is in the awake state includes: when detecting that the PMS is not woken up, waking up the PMS.

In one or more embodiments, ensuring that the PMS is in the awake state includes: when detecting that the PMS is woken up, maintaining the awake state of the PMS.

In one or more embodiments, the mobile terminal further includes a wake-up unit. The wake-up unit is configured to, before detecting by the paralleling unit 601 an unlocking instruction for the mobile terminal in a screen-off and screen-locked state, wake up the PMS when detecting that a system state of the mobile terminal meets a first preset condition.

In one or more embodiments, the mobile terminal further includes a generating unit. The generating unit is configured to: before detecting by the paralleling unit 601 an unlocking instruction for the mobile terminal in a screen-off and screen-locked state, generate the unlocking instruction when detecting that a touch operation in a preset area of the touch display screen of the mobile terminal in the screen-off and screen-locked state meets a second preset condition.

The paralleling unit 601 and the removing unit 602 may be a processor or a controller. The notifying unit 603 may be a touch display screen or a speaker or the like.

An embodiment of the present disclosure further provides a computer readable storage medium having stored computer programs for electronic data exchange. The computer programs cause a computer to perform a part of or all acts of any method of the embodiments of the present disclosure as described above. The computer includes a mobile terminal.

An embodiment of the present disclosure further provides a computer program product. The computer program product includes a non-transitory computer readable storage medium storing computer programs. The computer programs are operative to cause a computer to perform a part of or all acts of any method of the embodiments of the present disclosure as described above. The computer program product may be a software installation package. The computer includes a mobile terminal.

It should be noted that, for the foregoing method embodiments, for a brief description, they are all expressed as a series of act combinations, but those skilled in the art should know that the present disclosure is not subject to the described act sequence. Some acts may be performed in other sequences or concurrently in accordance with the present disclosure. Secondly, those skilled in the art should also understand that the embodiments described in the specification are all preferred embodiments, and the acts and modules involved are not necessarily required by the present disclosure.

In the foregoing embodiments, the descriptions of the various embodiments have their respective focuses, and the parts that are not detailed in a certain embodiment may refer to related descriptions of other embodiments.

In the several embodiments provided in the present disclosure, the disclosed device may be implemented in other manners. For example, the device embodiments described above are merely illustrative. For example, the division of the above units is only a logical function division. In actual implementation, there may be another division manner. For example, multiple units or components may be combined or integrated to another system, or some features may be ignored or not executed. In addition, the mutual coupling or direct coupling or communication connection illustrated or discussed may be an indirect coupling or communication connection through some interfaces, devices or units, which may be electrical or otherwise.

The units described above as separate components may or may not be physically separated, and the components displayed as units may or may not be physical units, i.e., the units and components may be in one place or distributed to multiple network units. Some or all the units may be selected according to actual needs to achieve the purpose of the solutions of the embodiments.

In addition, each functional unit in each embodiment of the present disclosure may be integrated into one processing unit, or each unit may exist physically separately, or two or more units may be integrated into one unit. The above integrated unit may be implemented in the form of hardware or in the form of a software functional unit.

The integrated unit described above, if implemented in the form of a software functional unit and sold or used as a standalone product, may be stored in a computer readable memory. Based on such understanding, the technical solutions of the present disclosure essentially, or a part contributing to the prior art in the technical solutions of the present disclosure, or all or part of the technical solutions of the present disclosure may be embodied in the form of a software product. The computer software product is stored in a memory and includes instructions for causing a computer device (which may be a personal computer, server or network device, etc.) to perform all or part of the acts of the above-described methods of various embodiments of the present disclosure. The foregoing memory includes: a U disk, a Read-Only Memory (ROM), a Random Access Memory (RAM), a removable hard disk, a magnetic disk, or an optical disk, and the like, which may store program codes.

Those skilled in the art may understand that all or part of the acts of the foregoing embodiments may be completed by a program to instruct related hardware. The program may be stored in a computer readable memory, and the memory may include: a flash disk, a Read-Only Memory (ROM), a Random Access Memory (RAM), a disk or a CD.

The embodiments of the present disclosure have been described in detail above, and the principles and implementations of the present disclosure are described herein by using specific examples. The description of the above embodiments is only for helping to understand the method of the present disclosure and its core ideas. It would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. mobile terminal, comprising:
   a processor;
   a face image collecting device, configured to collect a face image;
   a memory, configured to store a preset face template;
   wherein the processor is configured to carry out following actions, comprising:
   when detecting an unlocking instruction for the mobile terminal in a screen-off and screen-locked state, performing a first operation and a second operation in parallel without lighting a touch display screen, the first operation being a face recognition operation based on the face image and the preset face template, and the second operation being configured to ensure that a power management service (PMS) is in an awake state; and
   when detecting that a result of the face recognition operation is success, removing a screen locked interface in the screen-off and screen-locked state and notifying the PMS to light the touch display screen.

2. The mobile terminal of claim 1, wherein, the processor is further configured to carry out following actions, comprising:
   when detecting that the result of the face recognition operation is failure, notifying the PMS to light the touch display screen and outputting a message of prompting recognition failure; or
   when detecting that the result of the face recognition operation is failure, controlling the PMS to enter dormancy and controlling the mobile terminal to vibrate to prompt recognition failure.

3. The mobile terminal of claim 1, wherein ensuring that the PMS is in the awake state comprises:
   when detecting that the PMS is not woken up, waking up the PMS; or
   when detecting that the PMS is woken up, maintaining the awake state of the PMS.

4. The mobile terminal of claim 1, wherein the processor is further configured to carry out following actions, comprising:

waking up the PMS when detecting that a system state of the mobile terminal meets a first preset condition.

5. The mobile terminal of claim 4, wherein the system state comprises at least one of time information, location information, power information, a charging state and a high battery state.

6. The mobile terminal of claim 1, wherein, the processor is further configured to carry out following actions, comprising:
generating the unlocking instruction when detecting that a touch operation in a preset area of the touch display screen of the mobile terminal in the screen-off and screen-locked state meets a second preset condition.

7. The mobile terminal of claim 1, wherein, the first operation comprises at least one of a switching-on operation on the face image collecting device, a face image collecting operation, a feature extracting operation, a template comparing operation, and an operation of generating the result of the face recognition operation.

8. An unlocking control method, comprising:
when detecting an unlocking instruction for a mobile terminal in a screen-off and screen-locked state, performing a first operation and a second operation in parallel without lighting a touch display screen, the first operation being a face recognition operation and the second operation being configured to ensure that a power management service (PMS) is in an awake state;
when detecting that a result of the face recognition operation is success, removing a screen locked interface in the screen-off and screen-locked state; and
notifying the PMS to light the touch display screen.

9. The method of claim 8, further comprising:
when detecting that the result of the face recognition operation is failure, notifying the PMS to light the touch display screen and outputting a message of prompting recognition failure; or
when detecting that the result of the face recognition operation is failure, controlling the PMS to enter dormancy and controlling the mobile terminal to vibrate to prompt recognition failure.

10. The method of claim 8, wherein ensuring that the PMS is in the awake state comprises:
when detecting that the PMS is not woken up, waking up the PMS; or
when detecting that the PMS is woken up, maintaining the awake state of the PMS.

11. The method of claim 8, wherein the method further comprises:
waking up the PMS when detecting that a system state of the mobile terminal meets a first preset condition.

12. The method of claim 11, wherein the system state comprises at least one of time information, location information, power information, a charging state and a high battery state.

13. The method of claim 8, wherein the method further comprises:
generating the unlocking instruction when detecting that a touch operation in a preset area of the touch display screen of the mobile terminal in the screen-off and screen-locked state meets a second preset condition.

14. The method of claim 8, wherein, the first operation comprises at least one of a switching-on operation on the face image collecting device, a face image collecting operation, a feature extracting operation, a template comparing operation, and an operation of generating the result of the face recognition operation.

15. A non-transitory computer readable storage medium having stored computer programs for electronic data exchange, wherein the computer programs cause a computer to perform an unlocking control method, and the computer comprises a mobile terminal, and the method comprises:
when detecting an unlocking instruction for the mobile terminal in a screen-off and screen-locked state, performing a first operation and a second operation in parallel without lighting a touch display screen, the first operation being a face recognition operation and the second operation being configured to ensure that a power management service (PMS) is in an awake state;
when detecting that a result of the face recognition operation is success, removing a screen locked interface in the screen-off and screen-locked state; and
notifying the PMS to light the touch display screen.

16. The non-transitory computer readable storage medium of claim 15, wherein the method further comprises:
when detecting that the result of the face recognition operation is failure, notifying the PMS to light the touch display screen and outputting a message of prompting recognition failure; or
when detecting that the result of the face recognition operation is failure, controlling the PMS to enter dormancy and controlling the mobile terminal to vibrate to prompt recognition failure.

17. The non-transitory computer readable storage medium of claim 15, wherein ensuring that the PMS is in the awake state comprises:
when detecting that the PMS is not woken up, waking up the PMS; or
when detecting that the PMS is woken up, maintaining the awake state of the PMS.

18. The non-transitory computer readable storage medium of claim 15, wherein before detecting the unlocking instruction for the mobile terminal in the screen-off and screen-locked state, the method further comprises:
waking up the PMS when detecting that a system state of the mobile terminal meets a first preset condition.

19. The non-transitory computer readable storage medium of claim 18, wherein the system state comprises at least one of time information, location information, power information, a charging state and a high battery state.

20. The non-transitory computer readable storage medium of claim 15, wherein the method further comprises:
generating the unlocking instruction, when detecting that a touch operation in a preset area of the touch display screen of the mobile terminal in the screen-off and screen-locked state meets a second preset condition.

* * * * *